UNITED STATES PATENT OFFICE 2,580,325

TREATMENT OF POLYMER EMULSIONS

Milton J. Scott, Lexington, and Elwood F. Jackson, Ludlow, Mass., and Costas H. Basdekis, Dayton, Ohio, assignors to Monsanto Chemical Company, St. Louis, Mo., a corporation of Delaware No Drawing. Application August 5, 1949,
Serial No. 108,868

4 Claims. (Cl. 210—24)

This invention relates to molding powders, more particularly the invention relates to molding powders prepared by emulsion polymerization processes.

One of the best methods for preparing molding powders from vinyl and vinylidene compounds is by polymerization of one or more of the unsaturated monomers in aqueous emulsion followed by removal of the water either by coagulation of the emulsion followed by filtration and drying or by direct drying processes. The molding powders derived in this manner are excellent for general purpose use. However, in applications requiring electrical resistance or resistance to boiling water, the powders produced by aqueous emulsion methods have been of little use.

An efficient method for testing both the electrical resistance and the boiling water-resistance of the molding powders is to mold an article such as a disk and then subject the disk to boiling water for periods of at least an hour. Disks having poor electrical and hot water-resistance blush or whiten in such a test until they become opaque. Disks having good resistance to water and electrical current whiten only slightly if at all in the test.

It is an object of this invention to provide molding powders which may be molded into articles which will withstand boiling water without substantial whitening.

A further object of this invention is to provide a non-whitening molding powder from vinyl and vinylidene compounds polymerized in aqueous emulsion.

These and other objects are attained by treating the emulsion of the polymer before drying or coagulation with ion exchange resins.

The following examples are given in illustration and are not intended as limitations of the scope of this invention. Where parts are mentioned, they are parts by weight.

Example I

A polystyrene emulsion was prepared by polymerizing monomeric styrene in an aqueous medium containing a sodium salt of mahogany acids as an emulsifying agent, potassium persulfate as a polymerization catalyst and sodium bicarbonate as a hydrogen ion acceptor. The polymerization was carried out at reflux temperature and atmospheric pressure under constant agitation. The finished emulsion contained about 40% solids by weight. 1000 parts of the emulsion were admixed with 50 parts of a cation exchange resin prepared by sulfonation of a copolymer of styrene and divinyl benzene. The mixture was agitated for about two hours during which the pH of the emulsion dropped from 5.6 to 1.8. The resin was then removed from the emulsion by filtering the mixture through cheesecloth. The resultant emulsion was then mixed with about 50 parts of an anion exchange resin prepared by reaction of phenol with formaldehyde and a polyamine. The mixture was then agitated for about two hours during which the pH of the emulsion increased to about 4.8. The ion exchange resin was then removed by filtration and the emulsion was dried in an oven at about 110° C. until substantially all of the water was removed. The dry polymer was then milled on hot milling rolls and comminuted. The resultant powder was molded in an injection machine into a disk two inches in diameter. This disk was then immersed in boiling water for one hour after which it was found to have whitened very slightly. A similar disk prepared from a polystyrene powder obtained by emulsion polymerization in exactly the same method as just described but without treatment with the ion exchange resins, was also immersed in boiling water for one hour, at the end of which time it was totally opaque and white.

Example II

A copolymer was prepared by polymerizing 95 parts of styrene with 5 parts of an alpha-methyl styrene in an aqueous medium containing the sodium salt of mahogany acids as an emulsifying agent, potassium persulfate as a polymerization catalyst and sodium bicarbonate as a hydrogen ion acceptor. The resultant emulsion was passed through a column which had been packed with a cation exchange resin derived from a sulfonated copolymer of styrene and divinyl benzene. The emulsion after passing through the column containing the cation exchange resin was passed through a second column containing an anion exchange resin derived from phenol, formaldehyde and a polyamine. The emulsion recovered from the second column was somewhat thicker than the original emulsion but was still a true emulsion and no coagulation had occurred. The treated emulsion was dried in an oven at 110° C. until substantially no water was left in the polymer. The dry copolymer was rolled on hot milling rolls and then pulverized to form a molding powder. This molding powder was molded into a two inch disk by an injection molding method. The disk was tested in boiling water along with the disk molded from a similar copolymer which had not been treated with the ion exchange resins. The disk prepared from the treated resin did not whiten after one hour in boiling water whereas the disk prepared from the untreated resin was nearly opaque and white at the end of the one hour treatment.

The differences between the good and poor disks in the boiling water tests are due to the action of the ion exchange resins which remove the water-sensitive emulsifying agents and catalyst residues from otherwise water-impervious styrene polymers and copolymers.

The process of this invention may be applied to the purifications of emulsions of polymers and copolymers of vinyl and vinylidene compounds. It is especially advantageous for use with polymers and copolymers of styrene prepared in aqueous emulsion form. The vinyl and vinylidene compounds which may be prepared in aqueous emulsion are, in general, water-insoluble unsaturated compounds which will polymerize in the presence of peroxides or peroxide salts. Among the more important of these compounds are vinyl esters, vinyl ethers, vinyl halides, vinyl hydrocarbons, particularly styrene, alpha-methyl styrene, alpha-ethyl styrene, ring-substituted styrenes such as o-, m- or p-chloro-styrenes, 2,4-, 2,5- or 3,4-dichlorostyrenes, o-, m- or p-methyl styrenes, p-methyl-α-methyl styrene, vinyl naphthalene, divinyl benzene, divinyl naphthalene, acrylic and α-substituted acrylic acid derivatives including the esters, nitriles, amides and imides thereof, vinylidene halides, vinylidene esters, allyl and β-substituted allyl compounds including the allyl type alcohols and the esters and amides thereof, esters, amides and nitriles of α,β-ethyl-enically unsaturated dibasic acids, etc. The purification process may be applied to aqueous emulsion polymers and copolymers of the above compounds, whether or not the emulsion is to be coagulated and then dried or to be dried directly without coagulation.

The cation exchange resins which may be used in the process of this invention are generally water-insoluble solids containing acidic groups or radicals such as carboxylic acid or sulfonic acid groups or radicals. Examples of cation exchange resins are: sulfated lignins; sulfated peat; tannin-formaldehyde resins; tannins resinified with strong inorganic acids such as sulfuric acid, phosphoric acid or organic sulfonic acids; resins derived from monohydric or polyhydric phenols and aldehydes which are further modified with sulfurous acid, sulfites, bisulfites, sulfur dioxide, aromatic sulfonic acids such as cresyl sulfonic acid, amino carboxylic acids such as the amino acids derived from proteins and including glycine, alanine, glutamic acid, aspartic acid, arginine, histidine, hydroxyproline, proline, leucine, tyrosine, tryptophane, etc., semi-amides of polycarboxylic acids including oxamic acid, meleamic acid, phthalamic acid, succinamic acid, adipic monoamide, citric diamide, tricarballylic monoamide or diamide, naphthalic monoamide, partial amides of polymerized acrylic and alpha-substituted acrylic acids, etc., and nitroureas including N-substituted nitroureas such as N-methyl nitrourea, N-ethyl nitrourea, N-propyl nitrourea, N-isopropyl nitrourea, N-allyl nitrourea, N-furyl nitrourea, N-cyclohexyl nitrourea, etc.; furfural resinified with sulfites and an aldehyde or with an inorganic acid halide, such as sulfuryl chloride or phosphorous oxychloride, with or without a second aldehyde; aminoplasts modified with sulfites or bisulfites including the sulfited reaction products of an aldehyde with urea, thiourea, N-substituted ureas, dicyandiamide, ammeline, thioammeline, thioammeline ethers, alkyl ammelines, diamino diazines, triamino triazines such as melamine, etc.; sulfated natural and synthetic rubbers; copolymers of styrene, maleic anhydride and unconjugated polyenes such as allyl, substituted allyl, crotyl, propargyl, etc., esters of acrylic and alpha-substituted acrylic acids, diallyl and di(β-alkallyl esters) of saturated and unsaturated dibasic acids, divinyl benzene, divinyl ether, diallyl ether, and polyhydric alcohol polyesters of acrylic and alpha-substituted acrylic acids; copolymers of acrylic and alpha-substituted acrylic acids with non-conjugated polyenes with or without a monoolefinic compound such as vinyl and allyl derivatives including vinyl and allyl esters of saturated monobasic acids; etc.

The anion exchange resins which may be used in the process of this invention are generally water-insoluble solids containing basic nitrogen groups or radicals, e. g., amino, alkylamino, dialkyl amino, or quaternary ammonium radicals, etc. The strength of the basic radical may vary considerably depending on the substituents on the nitrogen atom of the basic radicals, e. g., a quaternary ammonium radical is so strongly basic that it will remove nearly any acid from aqueous media, whereas a tertiary amine radical is much weaker. Examples of anion exchange agents are resins formed by the condensation of formaldehyde with amines or polyamines, e. g., aniline, phenylene diamine or ethylene diamine; the resinous condensation products of a phenol, formaldehyde and an aliphatic amine, aliphatic polyamine, or a polyalkylene polyamine; the aldehyde condensation products of biguanide, guanyl urea, substituted guanidines such as methyl guanidine, substituted biguanides, such as phenyl biguanide, etc.

The treatment of the aqueous emulsions with the ion exchange resins may be substantially varied from the treatment shown in the examples. For instance, the emulsion may be treated first with the anion exchange resin and then with a cation exchange resin or it may be treated with a mixture of the two. In the examples, two methods of contacting the emulsion with the ion exchange resins were shown, i. e., agitating a mixture of the emulsion and the resin and passing the emulsion through columns containing the resins. The process may also be carried out by dipping mats impregnated with the ion exchange resins into a kettle or vat of the agitated emulsion or by passing the emulsion through pipes lined with the ion exchange resins. In any event the ion exchange resins are not destroyed or injured in any way by the process of this invention and may easily be regenerated. The cation exchange resins are regenerated by treating them with hydrochloric acid and the anion exchange resins are regenerated by treating them with sodium hydroxide. If a mixed bed of cation and anion resins is used, the resins are separated by such means as gravitational separators and the resins are then separately regenerated. The amount of resin which will be used will depend on the strength of the resin for ion exchange purposes and on the amount of extraneous material which is extracted from the emulsion by the resin.

The invention consists essentially of treating the emulsions with the ion exchange resins, Variables such as temperature at which the treatment was carried out, initial pH of the emulsion, solid content of the emulsion and time of contact with the resin are not necessarily critical. A minimum or maximum value may exist for each of these variables beyond which the process could not be carried out but that extremity will vary to a great extent depending upon the nature of the resin and the nature of the emulsion and can easily be determined by very simple experimentation.

In a special embodiment of this invention which is applicable only when a persulfate polymerization catalyst is used in the emulsion polymerization process, the emulsion may be treated with a cation exchange resin only. To the resultant emulsion containing sulfate ions is added sufficient barium hydroxide to neutralize the ions. The emulsion may then be direct dried or coagulated to obtain a molding powder which, when molded into specific shapes, does not soften or whiten in boiling water and which is substantially free from haze.

The process of this invention is particularly advantageous in the preparation of polymers and copolymers to be used in molding powder form which may be molded to articles having good electrical and boiling water resistance. The process is easily carried out and is extremely efficient in removing the impurities which cause the loss of electrical and hot water resistance in the polymers. It is particularly advantageous in connection with the preparation of molding powders from styrene by the emulsion polymerization process.

It is obvious that many variations may be made in the products and processes of this invention without departing from the spirit and scope thereof as defined in the appended claims.

What is claimed is:

1. A process for treating an aqueous emulsion of a vinylidene polymer to remove impurities consisting essentially of emulsifying agents and catalyst residues therefrom which are detrimental to the electrical and water-resistant properties thereof which comprises treating the emulsion with a cation exchange resin which is active in the hydrogen cycle until substantially all of the objectionable cations are removed from the emulsion, separating the resin from the emulsion, then treating the emulsion with an anion exchange resin until substantially all of the objectionable anions are removed and finally separating the anion exchange resin from the emulsion.

2. A process as in claim 1 wherein the vinylidene polymer is a styrene polymer.

3. A process for treating a completely emulsified vinylidene polymer containing an ionic emulsifying agent, a polymerization catalyst and a hydrogen ion acceptor which comprises (1) bringing the emulsion into intimate contact with an anion exchange resin and a cation exchange resin which is active in the hydrogen cycle, (2) separating the aqueous emulsion from the ion exchange resins thereby removing the emulsifying agent, catalyst residues and hydrogen ion acceptor residues and (3) removing the water from the polymer emulsion.

4. A process as in claim 3 wherein the vinylidene polymer is a styrene polymer.

MILTON J. SCOTT.
ELWOOD F. JACKSON.
COSTAS H. BASDEKIS.

REFERENCES CITED

The following references are of record in the file of this patent:

UNITED STATES PATENTS

| Number | Name | Date |
| --- | --- | --- |
| 2,102,642 | Otting et al. | Dec. 21, 1937 |
| 2,191,365 | Boyd | Feb. 20, 1940 |
| 2,461,505 | Daniel | Feb. 15, 1949 |

OTHER REFERENCES

Industrial and Engineering Chemistry, June 1951, pages 697–706.